US011927324B1

(12) United States Patent
Chen

(10) Patent No.: US 11,927,324 B1
(45) Date of Patent: Mar. 12, 2024

(54) SPECIAL LAMP CAP

(71) Applicant: Linhai Shanying Lighting Co., LTD., Taizhou (CN)

(72) Inventor: Chaohui Chen, Shanghai (CN)

(73) Assignee: Linhai Shanying Lighting Co., LTD., Taizhou (CN)

(*) Notice: Subject to any disclaimer, the term of this patent is extended or adjusted under 35 U.S.C. 154(b) by 0 days.

(21) Appl. No.: 18/118,226

(22) Filed: Mar. 7, 2023

(51) Int. Cl.
*F21V 17/12* (2006.01)
*F21V 31/00* (2006.01)

(52) U.S. Cl.
CPC ............ *F21V 17/12* (2013.01); *F21V 31/005* (2013.01)

(58) Field of Classification Search
CPC ............................... F21V 17/12; F21V 31/005
See application file for complete search history.

(56) References Cited

U.S. PATENT DOCUMENTS

2012/0113654 A1* 5/2012 Dai ......................... F21V 17/12 362/368
2017/0284649 A1* 10/2017 Ouellet ................... F21V 29/70

* cited by examiner

*Primary Examiner* — Jia X Pan
*Assistant Examiner* — Jessica M Apenteng
(74) *Attorney, Agent, or Firm* — Bay State IP, LLC

(57) ABSTRACT

The present disclosure relates to a special lamp cap which includes a lamp holder, a lamp holder female plug, a lamp bulb male plug, a lamp bulb shell and a nut. The lamp holder female plug is fixedly connected with the lamp holder. The lamp bulb male plug is detachably and fixedly connected with the lamp holder female plug. One end of the lamp bulb male plug extends into the interior of the lamp holder female plug. The lamp bulb shell is internally provided with a luminous body. The lamp bulb shell is fixedly connected with the lamp bulb male plug. The nut is detachably and fixedly connected with the lamp holder female plug. The nut sleeves the outside of the lamp holder female plug.

8 Claims, 5 Drawing Sheets

SPECIAL LAMP CAP

TECHNICAL FIELD

The present disclosure relates to the technical field of lamps and lanterns, in particular to a special lamp cap.

BACKGROUND

The lamp cap, referring to a connector connected at the tail end of an electric lamp line for mounting a lamp bulb, needs to be used carefully. The lamp cap is an important component of LED lamps, and plays the roles of blocking the end of the lamp tube and supporting the lamp base. Most of existing lamp caps are integrated structures.

The applicant finds that at least the following technical problems exist in the prior art: the lamp cap of an integrated structure is non-replaceable and poor in waterproof performance.

SUMMARY

The present disclosure aims to provide a special lamp cap, and at least solves the technical problem in the prior art that the special lamp cap is non-replaceable and poor in waterproof performance. Various technical effects generated by a preferred technical scheme in various technical schemes provided by the present disclosure are explained in detail as follow:

In order to achieve the above-mentioned purpose, the present disclosure provides the following technical scheme.

A special lamp cap is provided according to some embodiments of the present disclosure, including:

- a lamp holder;
- a lamp holder female plug, the lamp holder female plug being fixedly connected with the lamp holder;
- a lamp bulb male plug, the lamp bulb male plug being detachably and fixedly connected with the lamp holder female plug, and one end of the lamp bulb male plug extending into the interior of the lamp holder female plug;
- a lamp bulb shell, the lamp bulb shell being internally provided with a luminous body, and the lamp bulb shell being fixedly connected with the lamp bulb male plug; and
- a nut, the nut being detachably and fixedly connected with the lamp holder female plug, and the nut sleeving the outside of the lamp holder female plug.

According to the special lamp cap provided by some embodiments of the present disclosure, the interior of the lamp holder is provided with internal threads.

According to the special lamp cap provided by some embodiments of the present disclosure, the connecting part of the lamp holder female plug is externally provided with threads, a slot is arranged inside the lamp holder female plug, and a spacing is arranged between the connecting part of the lamp holder female plug and the inner wall of the lamp holder.

According to the special lamp cap provided by some embodiments of the present disclosure, the lamp holder includes a straight-line lamp holder, the lamp holder female plug includes a straight-line external thread lamp holder female plug, and the straight-line lamp holder and the straight-line external thread lamp holder female plug are integrally arranged.

According to the special lamp cap provided by some embodiments of the present disclosure, the lamp holder further includes an underslung lamp holder, the lamp holder female plug further includes an underslung external thread lamp holder female plug, and the underslung lamp holder and the underslung external thread lamp holder female plug are integrally arranged.

According to the special lamp cap provided by some embodiments of the present disclosure, one end of the lamp bulb male plug can be inserted into the slot of the lamp holder female plug, and the other end of the lamp bulb male plug is fixedly connected with one end of the lamp bulb shell.

According to the special lamp cap provided by some embodiments of the present disclosure, a cavity is formed in the lamp bulb shell, the luminous body is arranged in the cavity inside the lamp bulb shell, and the luminous body is connected with pins inside the lamp bulb male plug.

According to the special lamp cap provided by some embodiments of the present disclosure further includes a sealing ring, and the sealing ring sleeves the outside of the connecting part of the lamp bulb male plug.

According to the special lamp cap provided by some embodiments of the present disclosure, a threaded hole is formed in the nut along the axial direction, one end of the nut is provided with an inward flanged edge, and a first mounting part is arranged on the end face of the flanged edge.

According to the special lamp cap provided by some embodiments of the present disclosure further includes a dismounting device, wherein a through hole is formed in the dismounting device along the axial direction, a second mounting part is arranged at one end of the dismounting device, the second mounting part is matched with the first mounting part, and an anti-skid part is arranged at the other end of the dismounting device.

One or more technical schemes in the embodiment of the present disclosure at least have one of the following technical effects.

On the basis of the lamp holder, the lamp holder and the lamp holder female plug are fixedly connected to form a whole. By detachably inserting the lamp bulb male plug into the lamp holder female plug, the luminous body inside the lamp bulb shell can be electrified and lightened. The lamp bulb male plug and the lamp bulb shell are fixed through the nut, and the lamp bulb male plug is fixed inside the lamp holder female insert, so that the whole lamp cap can be replaced by being dismounted. At the same time, the sealing ring sleeves the outside of the lamp bulb male plug, so that the joint between the lamp holder female plug and the lamp bulb male plug is sealed, and the waterproof effect of the lamp cap is improved.

BRIEF DESCRIPTION OF THE DRAWINGS

To describe the technical solutions in the embodiments of the present disclosure or in the prior art more clearly, the following briefly describes the accompanying drawings required for describing the embodiments or the prior art. Apparently, the accompanying drawings in the following description show merely some embodiments of the present disclosure, and a person of ordinary skill in the art may derive other drawings from these accompanying drawings without creative efforts.

Figure 1:
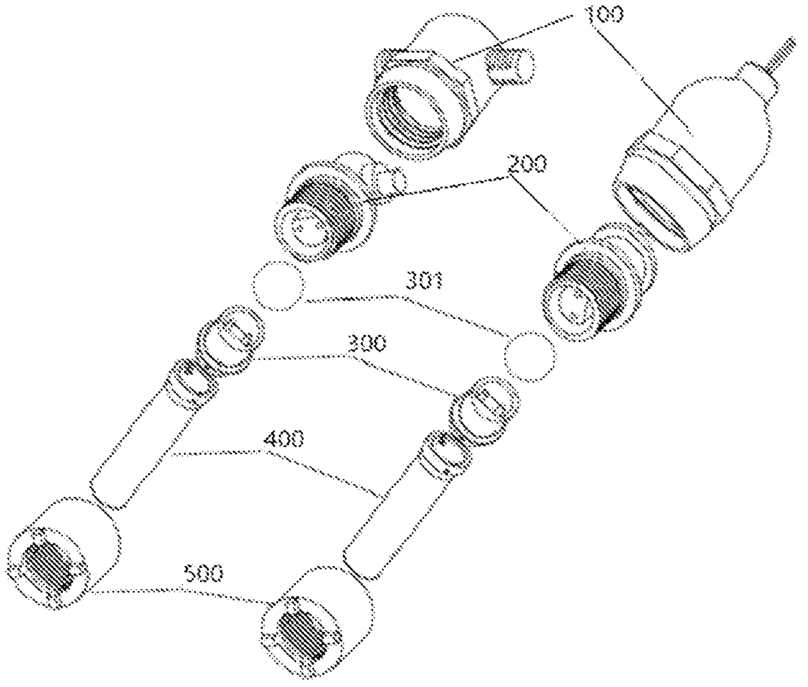
FIG. 1 is an explosive view in some embodiments of the present disclosure.

Reference signs: 100, lamp holder; 101, straight-line lamp holder; 102, underslung lamp holder; 200, lamp holder female plug; 201, straight-line external thread lamp holder female plug; 202, underslung external thread lamp holder female plug; 300, lamp bulb male plug; 301, sealing ring; 400, lamp bulb shell; 500, nut; 501, flanged edge; 502, first mounting part; 600, dismounting device; 601, second mounting part; and 602, anti-skid part.

DETAILED DESCRIPTION OF THE EMBODIMENTS

In order to make the purpose, technical scheme and advantages of the present disclosure more clear, the technical scheme of the present disclosure is described in detail as follows. Apparently, the embodiments in the following description are merely a part rather than all of the embodiments of the present disclosure. Based on the embodiment in the present disclosure, all other embodiments obtained by the ordinary technical staff in the art under the premise of without contributing creative labor belong to the scope protected by the present disclosure.

As shown in FIG. 1 to FIG. 9, a special lamp cap is provided according to some embodiments of the present disclosure, including:

- a lamp holder 100;
- a lamp holder female plug 200, the lamp holder female plug being fixedly connected with the lamp holder 100;
- a lamp bulb male plug 300, the lamp bulb male plug 300 being detachably and fixedly connected with the lamp holder female plug 200, and one end of the lamp bulb male plug 300 extending into the interior of the lamp holder female plug 200;
- a lamp bulb shell 400, the lamp bulb shell 400 being internally provided with a luminous body, and the lamp bulb shell 400 being fixedly connected with the lamp bulb male plug 300; and
- a nut 500, the nut 500 being detachably and fixedly connected with the lamp holder female plug 200, and the nut 500 sleeving the outside of the lamp holder female plug 200.

Wherein, the lamp holder 100 is the foundation of the integral structure of the lamp cap. The interior of the lamp holder 100 is provided with internal threads. A lamp shade matched with the lamp holder 100 can be mounted through the internal threads. The lamp holder female plug 200 is fixed inside the lamp holder 100. A jack and an anti-dull groove are formed in the interior of the lamp holder female plug 200. One end of the lamp bulb male plug 300 is provided with an inward anti-dull protrusion. The end, provided with the anti-dull protrusion, of the lamp bulb male plug 300 can be inserted into the lamp holder female plug 200 so that the pins of the lamp bulb male plug 300 extends into the jack of the lamp holder female plug 200.

In some embodiments, a cavity is formed in the lamp bulb shell 400, the luminous body is arranged in the cavity inside the lamp bulb shell 400, and the luminous body is connected with pins 300 inside the lamp bulb male plug 300.

The lamp bulb shell 400 is of a hollow shell structure. Preferably, the lamp bulb shell 400 is made of a transparent material. The lamp bulb shell 400 is internally provided with a luminous body PCB board. The luminous body PCB board is connected with the pins of the lamp bulb male plug 300. When the lamp bulb male plug 300 is inserted into the interior of the lamp holder female plug 200, the luminous body can be energized and lightened. The lamp bulb male plug 300 and the lamp holder female plug 200 are connected by a detachable connection mode, so that the lamp cap is convenient for later replacement and maintenance. In order to enable the connection of the lamp bulb male plug to be more tightly, the lamp holder female plug 200 and the lamp bulb male plug 300 are further fixed by setting the nut 500. At the same time, the internal sealing performance can also be improved to a certain extent, and the waterproof performance is improved.

In some embodiments, the connecting part of the lamp holder female plug 200 is externally provided with threads, a slot is arranged inside the lamp holder female plug 200, and a spacing is arranged between the connecting part of the lamp holder female plug 200 and the inner wall of the lamp holder 100.

The inner wall of the nut 500 is provided with internal threads. The internal threads of the nut 500 are matched with the external threads of the lamp holder female plug 200. The lamp holder female plug 200 and the nut 500 are connected by threads, so that the nut 500 is convenient to mount and dismount. Through the spacing between the connecting part of the lamp holder female plug 200 and the inner wall of the lamp holder 100, the side wall of the nut 500 can be embedded in the spacing.

Figure 2:
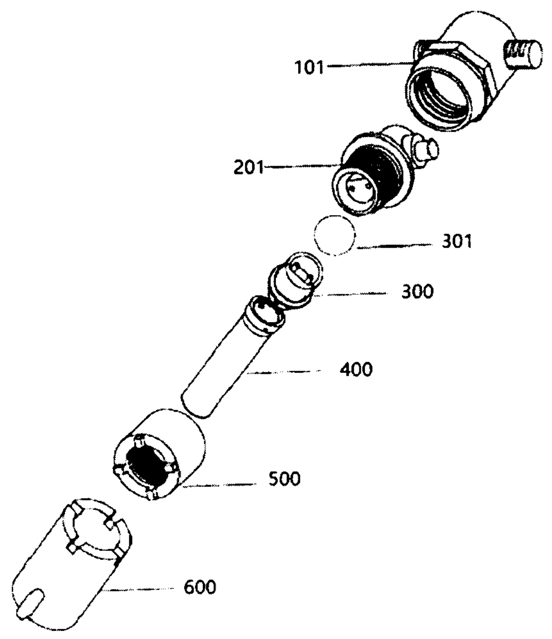
FIG. 2 is a structural schematic diagram in one embodiment in FIG. 1.
Figure 4:
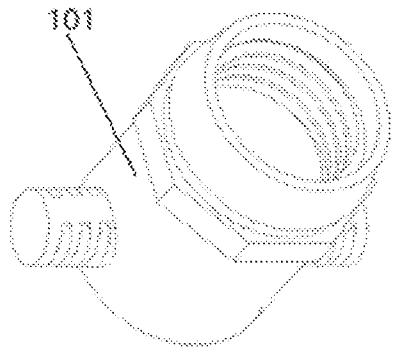
FIG. 4 is a straight-line schematic diagram in some embodiments of the present disclosure.
Figure 5:
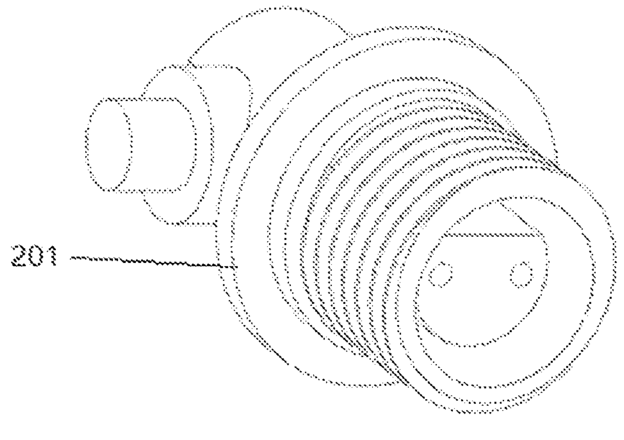
FIG. 5 is a structural schematic diagram of a straight-line external thread lamp holder female plug in some embodiments of the present disclosure.

Referring to FIG. 2, FIG. 4, and FIG. 5, in some embodiments, in order to adapt different using environments, the lamp holder 100 includes a straight-line lamp holder 101, the lamp holder female plug 200 includes a straight-line external thread lamp holder female plug 201, and the straight-line lamp holder 101 and the straight-line external thread lamp holder female plug 201 are integrally arranged. By adopting integrated arrangement, the lamp holder female plug 200 can be firmly fixed together, so that the joint is prevented from being loosened to further result in the problem of reduced tightness.

Figure 3:
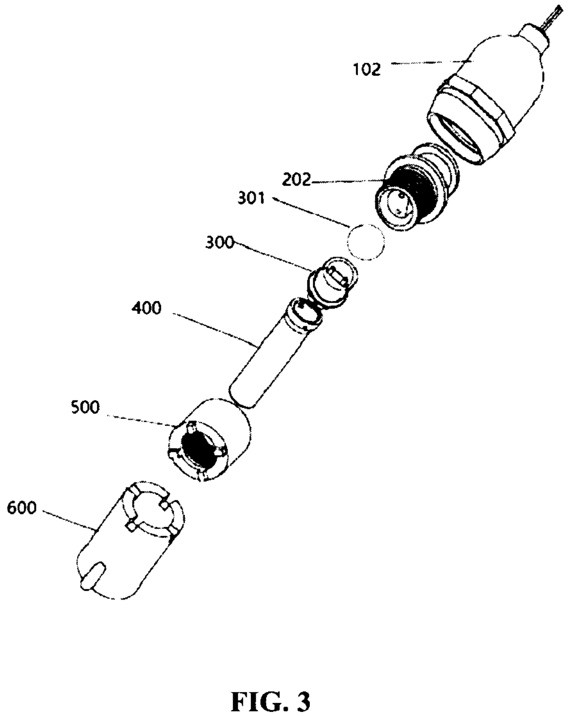
FIG. 3 is a structural schematic diagram in the other embodiment in FIG. 1.
Figure 6:
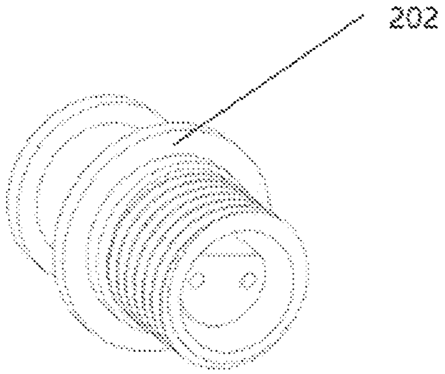
FIG. 6 illustrates an underslung external thread lamp holder female plug in some embodiments of the present disclosure.
Figure 7:
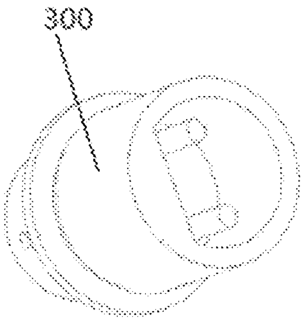
FIG. 7 is a schematic diagram of a lamp bulb male plug in some embodiments of the present disclosure.

Referring to FIG. 3 and FIG. 6, in some embodiments, in order to adapt different using environments, the lamp holder 100 further includes an underslung lamp holder 102, the lamp holder female plug 200 further includes an underslung external thread lamp holder female plug 202, and the underslung lamp holder 102 and the underslung external thread lamp holder female plug 202 are integrally arranged. The stability and sealing performance at the joint can be improved effectively.

Preferably, the lamp holder 100 and the lamp holder female plug 200 are integrally molded through injection.

Referring to FIG. 1 to FIG. 3 and FIG. 7, in some embodiments, one end of the lamp bulb male plug 300 can be inserted into the slot of the lamp holder female plug 200, and the other end of the lamp bulb male plug 300 is fixedly connected with one end of the lamp bulb shell 400.

The lamp bulb shell 400 is in the shape of a cylindrically hollow tube. The diameter of the end of the lamp bulb male plug 300 is larger than that of the end of the lamp bulb shell 400. When the lamp bulb male plug 300 and the lamp bulb shell 400 are connected together, the lamp bulb male plug 300 is provided with a protruding edge, so that the lamp bulb male plug 300 is conveniently fixed by the nut 500.

Referring to FIG. 1 to FIG. 3, the special lamp cap further includes a sealing ring 301. The sealing ring 300 sleeves the outside of the connecting part of the lamp bulb male plug 300. When the lamp bulb male plug 300 is inserted into the slot of the lamp holder female plug 200, the gap at the joint is sealed by the arranged sealing ring 301, thereby achieving the purpose of water resistance.

Figure 8:
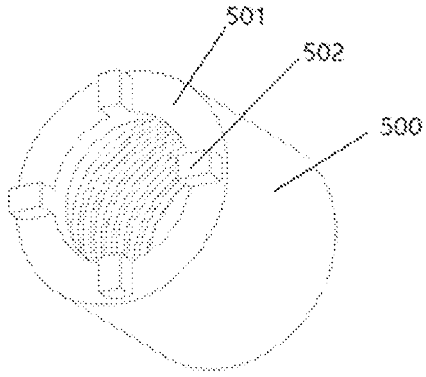
FIG. 8 is a schematic diagram of a nut in some embodiments of the present disclosure.

Referring to FIG. 8, in some embodiments, a threaded hole is formed in the nut 500 along the axial direction, one end of the nut 500 is provided with an inward flanged edge 501, and a first mounting part 502 is arranged on the end face of the flanged edge 501.

Referring to FIG. 1 to FIG. 3 and FIG. 8 to FIG. 9, in specific implementation, the lamp bulb shell 400 can pass through the threaded hole of the nut 500 and extend to the outside. When the internal threads of the nut 500 are connected to the external threads of the lamp holder female plug, the flanged edge 501 at the end can be attached to the protruding portion of the lamp bulb male plug 300, thereby further fixing the lamp bulb male plug 300. Due to the obstruction of the side wall of the lamp holder 100, the first mounting part 502 is used for tightly fixing the nut 500 to the lamp holder female plug 200.

In some embodiments, the special lamp cap further includes a dismounting device 600. A through hole is formed in the dismounting device 600 along the axial direction, a second mounting part 601 is arranged at one end of the dismounting device 600, the second mounting part 601 is matched with the first mounting part 502, and an anti-skid part 602 is arranged at the other end of the dismounting device 600.

Figure 9:
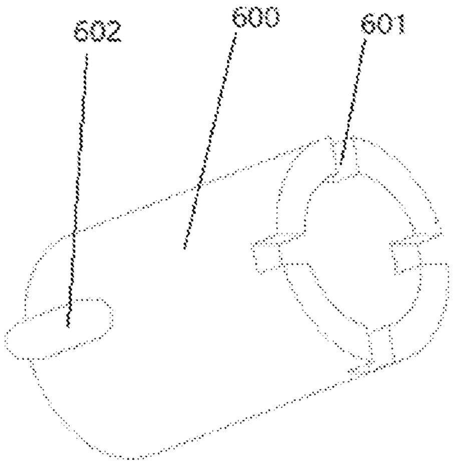
FIG. 9 is a schematic diagram of a dismounting device in some embodiments of the present disclosure.

In specific implementation, the first mounting part 502 is a protrusion. At least one first mounting part 502 is provided. As shown in FIG. 8, four first mounting parts 502 are provided. The four first mounting parts 502 are arranged in a cross shape. Referring to FIG. 9, the dismounting device 600 is used for mounting and dismounting the nut 500. The second mounting part 601 arranged at the end of the dismounting device 600 is a groove. The second mounting part 601 corresponds to the first mounting part 502. The first mounting part 502 can be embedded in the interior of the second mounting part 601. When in use, by rotating the dismounting device 600, the dismounting device 600 drives the nut 500 to rotate synchronously, so that the nut 500 is mounted on the lamp holder female plug 200. In order to facilitate the rotation of the dismounting device 600, the anti-skid part 602 is arranged on the side wall of the dismounting device 600. At least one anti-skid part 602 is provided. Preferably, the anti-skid part 602 includes a strip-shaped protrusion, but is not limited to this shape. The anti-skid part 602 may also be a groove or other members capable of facilitating the rotation of the dismounting device 600.

In the present disclosure, the detachably connected structure of the lamp holder female plug 200 and the lamp bulb male plug 300 is matched with the nut 500 to form a structure convenient for disassembly and maintenance, so that the problem that the traditional lamp cap is non-replaceable is solved. The internal sealing performance is improved by setting the sealing ring 301 and other threaded structures, so that the lamp cap has a good waterproof effect.

In the description of the present disclosure, it needs to be illustrated that, except as otherwise noted, the meaning of "a plurality of" is two or more than two; and the indicative direction or position relations of the terms such as "upper", "lower", "left", "right", "inside", "outside", "front end", "rear end", "head" and "tail" are direction or position relations illustrated based on the accompanying diagrams, just for facilitating the description of the present disclosure and simplifying the description, but not for indicating or hinting that the indicated device or element must be in a specific direction and is constructed and operated in the specific direction, the terms cannot be understood as the restriction of the present disclosure. Moreover, the terms such as "first", "second", and "third" are just used for distinguishing the description, but cannot be understood to indicate or hint relative importance.

In the description of the present disclosure, it further needs to be illustrated that, except as otherwise noted, the terms such as "mount", "link" and "connect" should be generally understood. For example, the components can be fixedly connected, and also can be detachably connected or integrally connected; the components can be mechanically connected, and also can be electrically connected; and the components can be directly connected, and also can be indirectly connected through an intermediate. For those skilled in the art, the specific meanings of the terms in the present disclosure can be understood according to specific conditions.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A special lamp cap, comprising:

a lamp holder;

a lamp holder female plug, the lamp holder female plug being fixedly connected with the lamp holder;

a lamp bulb male plug, the lamp bulb male plug being detachably and fixedly connected with the lamp holder female plug, and one end of the lamp bulb male plug extending into the interior of the lamp holder female plug;

a lamp bulb shell, the lamp bulb shell being internally provided with a luminous body, and the lamp bulb shell being fixedly connected with the lamp bulb male plug; and a nut, the nut being detachably and fixedly connected with the lamp holder female plug, and the nut sleeving the outside of the lamp holder female plug;

wherein a threaded hole is formed in the nut along the axial direction, one end of the nut is provided with an inward flanged edge, and a first mounting part is arranged on the end face of the flanged edge;

further comprising a dismounting device, wherein a through hole is formed in the dismounting device along the axial direction, a second mounting part is arranged at one end of the dismounting device, the second mounting part is matched with the first mounting part, and an anti-skid part is arranged at the other end of the dismounting device.

2. The special lamp cap according to claim 1, wherein the interior of the lamp holder is provided with internal threads.

3. The special lamp cap according to claim 2, wherein the connecting part of the lamp holder female plug is externally provided with threads, a slot is arranged inside the lamp holder female plug, and a spacing is arranged between the connecting part of the lamp holder female plug and the inner wall of the lamp holder.

4. The special lamp cap according to claim 3, wherein the lamp holder comprises a straight-line lamp holder, the lamp holder female plug comprises a straight-line external thread lamp holder female plug, and the straight-line lamp holder and the straight-line external thread lamp holder female plug are integrally arranged.

5. The special lamp cap according to claim 4, wherein the lamp holder further comprises an underslung lamp holder, the lamp holder female plug further comprises an underslung external thread lamp holder female plug, and the underslung lamp holder and the underslung external thread lamp holder female plug are integrally arranged.

6. The special lamp cap according to claim 5, wherein one end of the lamp bulb male plug can be inserted into the slot of the lamp holder female plug, and the other end of the lamp bulb male plug is fixedly connected with one end of the lamp bulb shell.

7. The special lamp cap according to claim 6, wherein a cavity is formed in the lamp bulb shell, the luminous body is arranged in the cavity inside the lamp bulb shell, and the luminous body is connected with pins inside the lamp bulb male plug.

8. The special lamp cap according to claim 7, further comprising a sealing ring, and the sealing ring sleeves the outside of the connecting part of the lamp bulb male plug.

* * * * *